United States Patent
Zaroo et al.

(10) Patent No.: US 11,775,515 B2
(45) Date of Patent: Oct. 3, 2023

(54) DATASET OPTIMIZATION FRAMEWORK

(71) Applicant: NETFLIX, INC., Los Gatos, CA (US)

(72) Inventors: Puneet Zaroo, Los Gatos, CA (US);
Eva Tse, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/485,968

(22) Filed: Sep. 27, 2021

(65) Prior Publication Data

US 2023/0103011 A1    Mar. 30, 2023

(51) Int. Cl.
| | |
|---|---|
| *G06F 16/2453* | (2019.01) |
| *G06F 16/21* | (2019.01) |
| *G06F 16/22* | (2019.01) |
| *G06F 11/14* | (2006.01) |
| *G06F 11/34* | (2006.01) |

(52) U.S. Cl.
CPC ...... *G06F 16/2453* (2019.01); *G06F 11/1402* (2013.01); *G06F 11/3409* (2013.01); *G06F 16/21* (2019.01); *G06F 16/2282* (2019.01)

(58) Field of Classification Search
CPC ... G06F 16/2453; G06F 16/21; G06F 16/2282
See application file for complete search history.

(56) References Cited

U.S. PATENT DOCUMENTS

| | | | | |
|---|---|---|---|---|
| 10,282,350 B1 * | 5/2019 | Pathak | ............... | G06F 16/2453 |
| 10,650,073 B1 * | 5/2020 | Manzi | .................... | H04L 67/02 |
| 2006/0085378 A1 | 4/2006 | Raizman et al. | | |
| 2007/0136383 A1 | 6/2007 | Steinback et al. | | |
| 2007/0299810 A1 | 12/2007 | Riedel et al. | | |
| 2015/0317361 A1 | 11/2015 | Battaglia et al. | | |
| 2016/0150162 A1 * | 5/2016 | Vuskovic | ............... | H04N 7/12 386/281 |
| 2017/0221153 A1 * | 8/2017 | Allbright | ............... | H03M 7/30 |
| 2019/0005092 A1 * | 1/2019 | Le | ..................... | G06F 16/2246 |
| 2019/0102411 A1 | 4/2019 | Hung et al. | | |
| 2020/0226109 A1 | 7/2020 | Das et al. | | |

(Continued)

OTHER PUBLICATIONS

Apache Software Foundation Apache Parquet, https://parquet.apache.org/documentation/latest/, 7 pages.

(Continued)

*Primary Examiner* — Dangelino N Gortayo
(74) *Attorney, Agent, or Firm* — Artegis Law Group, LLP

(57) ABSTRACT

One embodiment of the present invention sets forth a technique for optimizing data in a dataset. The technique includes determining, based on one or more attributes of a dataset, an optimization that is associated with at least one of a file encoding, a file size, and a sort column. The technique also includes identifying a plurality of candidate configurations associated with the dataset and corresponding to the optimization, and for each candidate configuration, generating a corresponding set of evaluation metrics associated with the first optimization. The technique further includes determining, based on the sets of evaluation metrics corresponding to the plurality of candidate configurations, a set of configurations in the plurality of candidate configurations to be applied to the dataset. Finally, the technique includes modifying the dataset based on the set of configurations.

20 Claims, 8 Drawing Sheets

(56) References Cited

U.S. PATENT DOCUMENTS

| | | | |
|---|---|---|---|
| 2021/0034598 A1* | 2/2021 | Arye | G06F 16/288 |
| 2021/0089532 A1* | 3/2021 | Patel | G06F 16/24542 |

OTHER PUBLICATIONS

Das et al., "Automatically Indexing Millions of Databases in Microsoft Azure SQL Database", https://www.microsoft.com/en-us/research/uploads/prod/2019/02/autoindexing_azuredb.pdf, 14 pages.

Iceberg Table Spec, https://iceberg.apache.org/spec/, 27 pages.

International Search Report for Application No. PCT/US2022/076055 dated Jan. 5, 2023.

Syam, Anupom, "Optimizing data warehouse storage", Published in Netflix Technology Blog, Retrieved from the Internet: URL:https://netflixtechblog.com/optimizing-data-warehouse-storage-7b94a48fdcbe, Dec. 21, 2020, 13 pages.

* cited by examiner

DATASET OPTIMIZATION FRAMEWORK

BACKGROUND

Field of the Various Embodiments

Embodiments of the present disclosure relate generally to managing large datasets and, more specifically, to a dataset optimization framework.

Description of the Related Art

Increasing amounts of data are collected, stored, and processed by organizations and other entities. For example, a company could collect petabytes of data related to millions or billions of users or devices and store the data in tens or hundreds of thousands of datasets within a data warehouse. The company could also query the data from the data warehouse and/or process the data to generate recommendations, alerts, or other types of output or actions based on the data.

However, datasets in data warehouses and/or other types of data stores are frequently stored in unoptimized formats that result in inefficiencies in storage utilization, query overhead, and/or other measures of performance. For example, a dataset could include rows representing records of events and columns representing fields in the records. As additional events are collected, the corresponding records are appended as additional rows to the dataset. As the dataset grows, a suboptimal configuration of the dataset could increase the amount of space occupied by the dataset and/or the time required to query the dataset. Eventually, the dataset can consume a significant proportion of storage resources available to an organization and/or incur query overhead that negatively impacts processing by downstream applications or services.

Inefficiencies in the storage, querying, and/or performance of a dataset are identified and addressed via a time-consuming, manual, and inefficient process. For a given dataset, the process often involves evaluating and comparing many different permutations of configuration parameters and format changes in order to identify and resolve the inefficiencies in the dataset. This evaluation and comparison process is computationally and time intensive. Furthermore, as datasets grow in size and complexity, the number of permutations of configuration parameters and format changes that need to be evaluated also increases. In resource constrained systems, comparing the performance of different permutations is not viable because of the amount of resources needed to evaluate the permutations. Consequently, in these systems, the set of configurations or format changes that result in the most improvement in the performance metric(s) is never identified, thereby limiting the extent to which the dataset can be optimized with respect to the performance metric(s).

As the foregoing illustrates, what is needed in the art are more effective techniques for optimizing datasets in data stores.

SUMMARY

One embodiment of the present invention sets forth a technique for optimizing data in a dataset. The technique includes determining, based on one or more attributes of a first dataset, a first optimization that is associated with at least one of a file encoding, a file size, and a sort column. The technique also includes identifying a first plurality of candidate configurations associated with the first dataset and corresponding to the first optimization, and for each candidate configuration in the first plurality of candidate configurations, generating a corresponding set of evaluation metrics associated with the first optimization. The technique further includes determining, based on the sets of evaluation metrics corresponding to the first plurality of candidate configurations, a first set of configurations in the first plurality of candidate configurations to be applied to the first dataset. Finally, the technique includes modifying the first dataset based on the first set of configurations.

One technical advantage of the disclosed techniques relative to the prior art is that, with the disclosed techniques, datasets in a data store can be automatically and efficiently identified as candidates for multiple types of optimization, evaluated with respect to various configurations related to each type of optimization, and modified to incorporate one or more configurations that improve different types of performance. Accordingly, the disclosed techniques generate greater improvements in storage utilization, query overhead, and/or other performance metrics related to the datasets than conventional techniques that can only evaluate the impact of a limited set of configuration changes on the performance metric(s). Further, because datasets are scanned, evaluated, and optimized in an efficient manner, the disclosed techniques are faster, more scalable, and incur less resource overhead than conventional techniques that involve teams of users interacting with tools or applications to manually identify datasets that are performing suboptimally, apply configuration changes to individual datasets, and analyze the impact of the configuration changes on the performance of each dataset. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
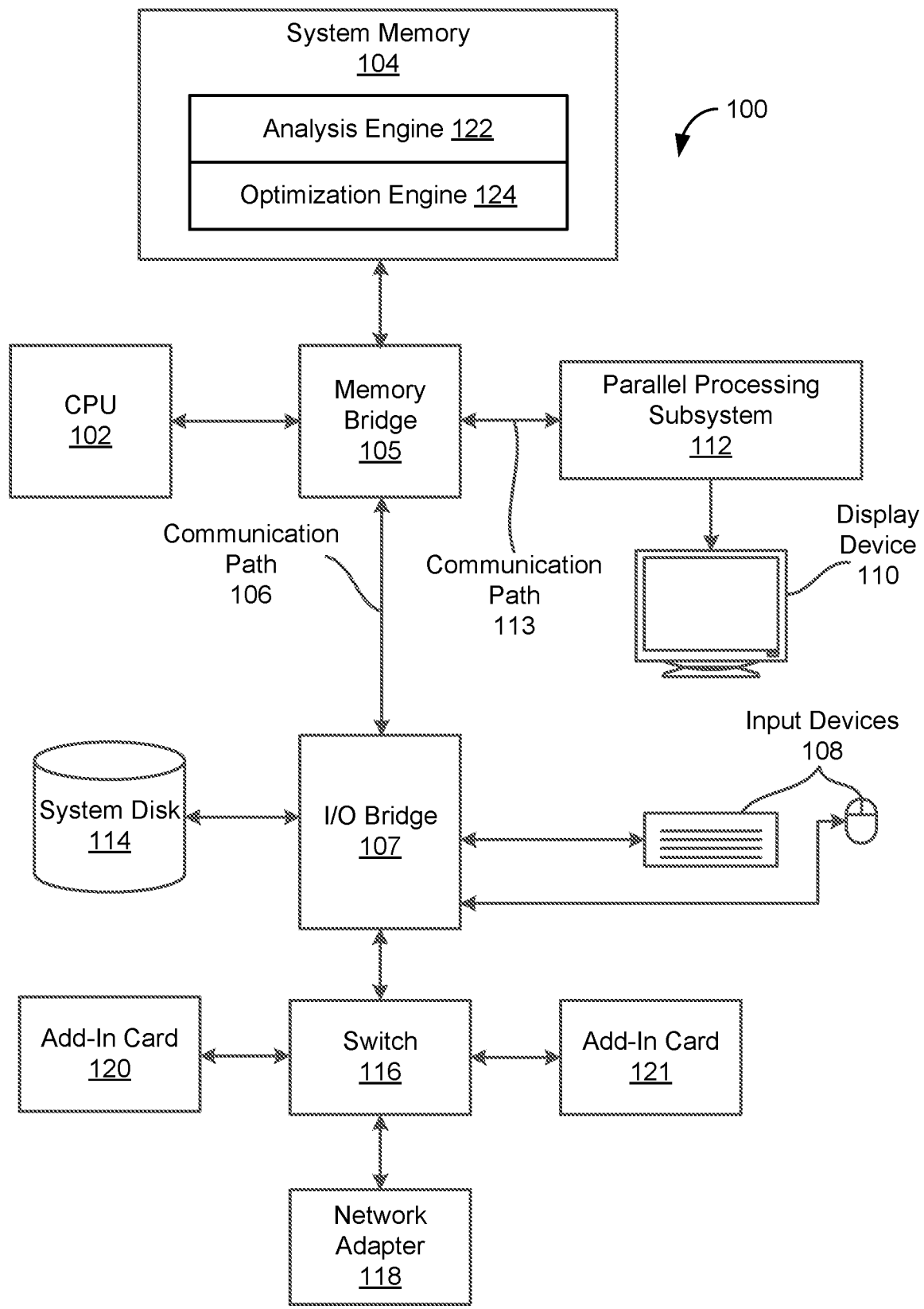
FIG. 1 is a block diagram illustrating a computer system configured to implement one or more aspects of various embodiments.

In the following description, numerous specific details are set forth to provide a more thorough understanding of the various embodiments. However, it will be apparent to one of skill in the art that the inventive concepts may be practiced without one or more of these specific details.

Data stores such as databases and data warehouses are used to store increasing quantities of data across increasing numbers of datasets. For example, an organization can store petabytes of data related to users, devices, events, sensor readings, and/or other entities across tens or hundreds of thousands of datasets. Over time, a given dataset can increase in size to accommodate new data that has been collected or generated. New datasets can also be created to store different types of data.

As a dataset grows, a suboptimal configuration of the dataset can degrade one or more performance characteristics associated with the dataset. For example, inefficiencies in the configuration of the dataset could increasingly contribute to the amount of space occupied by the dataset and/or the time required to query the dataset as records are added to the dataset. Eventually, the dataset could consume a significant proportion of available storage resources and/or incur query overhead that negatively impacts processing by downstream applications or services.

To improve the storage utilization and/or query overhead associated with a data store, a dataset optimization framework applies various types of optimizations to datasets in a data store. These optimizations include (but are not limited to) changes to file encodings, file sizes, sort columns, and/or storage tiers associated with the dataset. These changes can be made to improve the storage utilization, query overhead, and/or another measure of performance associated with the dataset.

First, the dataset optimization framework discovers datasets that are likely to benefit the most from each type of optimization. In particular, the dataset optimization framework scans datasets in the data store for attributes that indicate a potential compatibility with a certain type of optimization. Datasets that include these attributes are then flagged as candidates for that type of optimization.

Next, the dataset optimization framework runs experiments to determine the most optimal configuration of a dataset that is identified as a candidate for a particular type of optimization. The experiments test or simulate various configurations of the dataset that are related to the optimization and estimate the impact of each configuration on storage utilization, query overhead, and/or other performance metrics. The experiments are additionally designed or selected to minimize the impact on the data store.

The dataset optimization framework also applies one or more configurations that improve the desired performance metrics to the dataset and monitors the performance of the dataset to verify that the configuration(s) have the expected effect. For example, the dataset optimization framework could rewrite the dataset and/or metadata related to the dataset to apply the configuration(s) to the dataset. The dataset optimization framework could then monitor performance metrics for the dataset to verify that the improvements identified in experiments related to the configuration(s) are observed in the actual dataset.

Finally, the dataset optimization framework uses the monitored performance metrics to further optimize the dataset and/or other datasets. For example, the dataset optimization framework could roll back a change to the configuration of the dataset if the performance metrics indicate that the configuration does not improve or negatively impacts the storage utilization, query overhead, and/or another type of performance metric associated with the dataset. In another example, the dataset optimization framework could determine that the configuration successfully improves one or more performance metrics of interest. The dataset optimization framework could then apply the same configuration to a different dataset that shares one or more attributes with the dataset.

One technical advantage of the disclosed techniques relative to the prior art is that, with the disclosed techniques, datasets in a data store can be automatically and efficiently identified as candidates for multiple types of optimization, evaluated with respect to various configurations related to each type of optimization, and modified to incorporate one or more configurations that improve different types of performance. Accordingly, the disclosed techniques generate greater improvements in storage utilization, query overhead, and/or other performance metrics related to the datasets than conventional techniques that can only evaluate the impact of a limited set of configuration changes on the performance metric(s). Further, because datasets are scanned, evaluated, and optimized in an efficient manner, the disclosed techniques are faster, more scalable, and incur less resource overhead than conventional techniques that involve teams of users interacting with tools or applications to manually identify datasets that are performing suboptimally, apply configuration changes to individual datasets, and analyze the impact of the configuration changes on the performance of each dataset. These technical advantages provide one or more technological advancements over prior art approaches.

System Overview

FIG. 1 is a block diagram illustrating a computer system 100 configured to implement one or more aspects of various embodiments. In some embodiments, computer system 100 is a machine or processing node operating in a data center, cluster, or cloud computing environment that provides scalable computing resources (optionally as a service) over a network.

As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 includes a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIG. 2, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112.

Parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. First, the functionality of the system can be distributed across multiple nodes of a distributed and/or cloud computing system. Second, the connection topology, including the number and arrangement of bridges, the number of CPUs 102, and the number of parallel processing subsystems 112, can be modified as desired. For example, in some embodiments, system memory 104 could be connected to CPU 102 directly rather than through memory bridge 105, and other devices would communicate with system memory 104 via memory bridge 105 and CPU 102. In another example, parallel processing subsystem 112 may be connected to I/O bridge 107 or directly to CPU 102, rather than to memory bridge 105. In a third example, I/O bridge 107 and memory bridge 105 may be integrated into a single chip instead of existing as one or more discrete devices. Third one or more components shown in FIG. 1 may not be present. For example, switch 116 could be eliminated, and network adapter 118 and add-in cards 120, 121 would connect directly to I/O bridge 107.

In one or more embodiments, computer system 100 is configured to execute an analysis engine 122 and an optimization engine 124 that reside in system memory 104. Analysis engine 122 and optimization engine 124 may be stored in system disk 114 and/or other storage and loaded into system memory 104 when executed.

More specifically, analysis engine 122 and optimization engine 124 implement a dataset optimization framework that performs a multi-stage process to automatically apply various types of optimizations to datasets in a data store. These optimizations include (but are not limited to) changes to file encodings, file sizes, sort columns, and/or storage tiers associated with the dataset. These changes can be made to improve the storage utilization, query overhead, and/or another measure of performance associated with the dataset. As described in further detail below, analysis engine 122 and optimization engine 124 automatically discover and prioritize datasets that are likely to benefit the most from each type of optimization, run experiments to determine the most optimal configuration for a given dataset and optimization, apply one or more configurations that improve the desired performance metrics to the dataset, monitor the performance of each dataset after any configuration changes are made, and use the monitored performance to further optimize the dataset and/or other datasets. Consequently, analysis engine 122 and optimization engine 124 improve the efficiency with which datasets in the data store are stored and queried while reducing overhead and resource consumption associated with optimizing the datasets.

Automatic Optimization of Datasets

Figure 2:
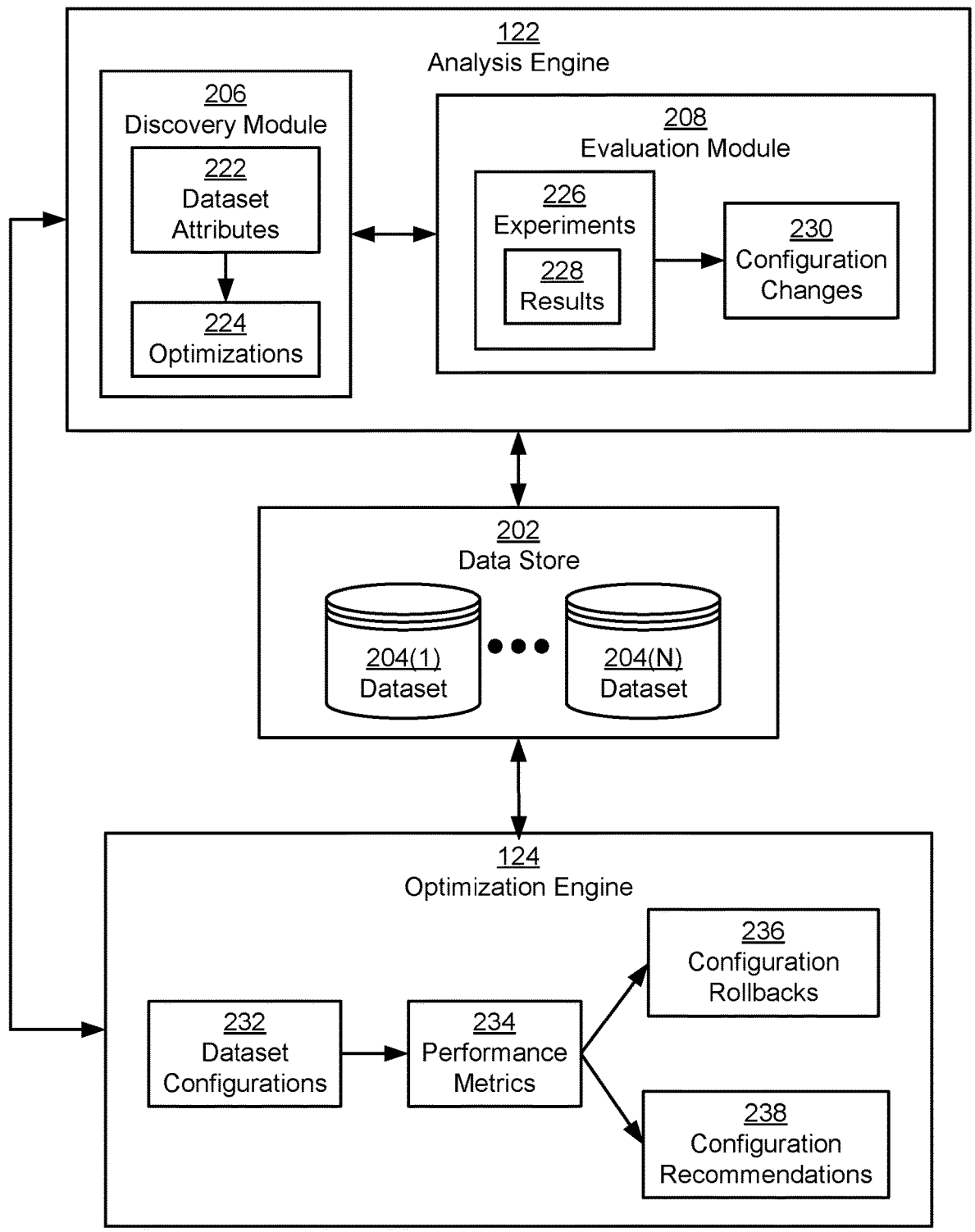
FIG. 2 is a more detailed illustration of the analysis engine and optimization engine of FIG. 1, according to various embodiments.

FIG. 2 is a more detailed illustration of analysis engine 122 and optimization engine 124 of FIG. 1, according to various embodiments. As mentioned above, analysis engine 122 and optimization engine 124 implement a dataset optimization framework that performs a multi-stage optimization process to automatically optimize datasets 204(1)-(N) in a data store 202 with respect to storage utilization, query overhead, and/or other performance metrics.

For example, datasets 204 within data store 202 could be stored in one or more relational databases, graph databases, column-oriented databases, row-oriented databases, hierarchical databases, key-value databases, flat files, and/or other types of data storage formats. Analysis engine 122 and optimization engine 124 could include applications, tools, and/or other components that reside within or interface with a data warehouse, database, and/or another implementation of data store 202. These components of analysis engine 122 and optimization engine 124 could interact with other components of data store 202 to access datasets 204 and perform operations related to optimizing datasets 204.

In one or more embodiments, a discovery module 206 in analysis engine 122 performs efficient scans and/or analyses of datasets to identify a subset of datasets 204 as candidates for one or more optimizations 224. More specifically, discovery module 206 matches dataset attributes 222 of one or more datasets 204 to optimizations 224 that can be applied to the dataset(s). For example, each optimization could be associated with one or more values or one or more ranges of values for metrics related to storage utilization, compression, file access during querying, frequency of access to a dataset, the time since a dataset was last accessed or first accessed, and/or other types of dataset attributes 222 of datasets 204 that are likely to benefit from the optimization. Discovery module 206 could operate on a periodic, continuous, or on-demand basis to scan datasets 204 in data store 202. During a given scan, discovery module 206 could identify one or more datasets 204 as candidates for a corresponding optimization when the dataset(s) have dataset attributes 222 that match the corresponding values or ranges of values associated with the optimization.

For each dataset identified by discovery module 206 as a candidate for an optimization, an evaluation module 208 in analysis engine 122 executes a number of experiments 226 to estimate the impact of various dataset configurations related to the optimization on the query overhead, storage utilization, and/or another performance metric related to the dataset. For example, evaluation module 208 could run experiments 226 to test different types of file encodings, file sizes, sort columns, storage tiers, and/or other optimizations on the dataset. Each experiment could be applied to a portion of the dataset and/or metadata for the dataset to efficiently estimate or simulate the effect of a given configuration associated with the optimization on the dataset. Evaluation module 208 could then generate results 228 of each experiment that include measures of query overhead, storage utilization, and/or other performance metrics before and after a given configuration is applied to the dataset or simulated within the experiment.

Evaluation module 208 also identifies one or more configuration changes 230 that can be applied to a given dataset based on results 228 of experiments 226 involving the dataset. For example, evaluation module 208 could identify one or more configuration changes 230 related to file encoding, file size, sort column, storage tier, and/or other optimizations 224 that improve query overhead, storage utilization, and/or another type of performance metric targeted by a certain optimization. Evaluation module 208 could also, or instead, verify that each configuration change does not negatively impact the query overhead, storage utilization, and/or another type of performance metric beyond a threshold. In other words, evaluation module 208 includes functionality to identify configuration changes 230 that improve a performance metric targeted by the optimization without overly degrading other performance metrics related to the dataset.

After configuration changes 230 to be made to one or more datasets 204 are identified by evaluation module 208, optimization engine 124 applies configuration changes 230 to one or more dataset configurations 232 for the dataset(s). For example, optimization engine 124 could rewrite a dataset so that the dataset includes a file encoding, file size, sort column, and/or another configuration change identified by evaluation module as an optimization to the dataset. In another example, optimization engine 124 could effect configuration changes 230 by rewriting table properties and/or metadata for the dataset, thereby causing reads, writes, and/or rewrites of the dataset by other components to conform to configuration changes 230.

Optimization engine 124 also monitors performance metrics 234 for each dataset after one or more dataset configurations 232 have been applied to the dataset. For example, optimization engine 124 could calculate and/or track the query overhead, storage utilization, storage cost, and/or other performance metrics 234 for the dataset for a number of days or weeks after the dataset has been modified to include a configuration change identified by evaluation module 208.

Optimization engine 124 selectively performs configuration rollbacks 236 based on the monitored performance metrics 234 for each dataset. For example, optimization engine 124 could determine that a configuration change that is associated with an optimization and applied to a dataset does not result in an improvement in query overhead, storage utilization, and/or another performance metric of interest. Optimization engine 124 could also, or instead, determine that the configuration improves the performance metric of interest but additionally degrades another performance metric beyond an acceptable threshold. In both instances, optimization engine 124 would roll back (i.e., undo) the configuration change to prevent the configuration change from further adversely impacting the performance of the dataset.

Optimization engine 124 also, or instead, uses performance metrics 234 for a dataset to generate configuration recommendations 238 that are used with subsequent analyses or optimizations of datasets 204. For example, optimization engine 124 could determine that a certain type of configuration does not lead to an improvement in a performance metric of interest, even when results 228 of experiments 226 suggest that the configuration is likely to improve the performance metric. Optimization engine 124 could then instruct analysis engine 122 to omit subsequent experiments 226 involving that type of configuration and/or omit configuration changes 230 to dataset configurations 232 that include that type of configuration. In another example, optimization engine 124 could determine that a certain configuration leads to a consistent and/or significant improvement in a performance metric of interest for datasets 204 that share one or more dataset attributes 222. Optimization engine 124 could communicate an association between these dataset attributes 222 and the configuration to discovery module 206, and discovery module 206 could perform subsequent scans that identify datasets with these dataset attributes 222 as candidates for the optimization associated with the configuration.

In one or more embodiments, analysis engine 122 and optimization engine 124 operate periodically, continuously, and/or in an on-demand basis to discover additional datasets 204 that are candidates for various optimizations 224, run experiments 226 that estimate the impact of configuration changes 230 related to optimizations 224 on the discovered datasets 204, modify dataset configurations 232 to include configuration changes 230 associated with an improvement in one or more performance metrics 234 of interest, monitor performance metrics 234 after configuration changes 230 have been made to datasets 204, and/or perform configuration rollbacks 236 or generate configuration recommendations 238 based on the monitored performance metrics 234.

In doing so, analysis engine 122 and optimization engine 124 can identify new datasets 204 that are candidates for optimizations 224 and/or changes to dataset attributes 222 of existing datasets that cause these datasets to be candidates for optimizations 224. Analysis engine 122 and optimization engine 124 can also ensure that existing optimizations 224 are having the intended effect on the corresponding datasets 204, roll back optimizations 224 that have a detrimental effect on the corresponding datasets 204, perform new types of optimizations 224 on datasets 204, and/or refine associations of dataset attributes 222 with optimizations 224 based on the effects of optimizations 224 on performance metrics 234 for the corresponding datasets 204. The operation of analysis engine 122 and optimization engine 124 is described in further detail below with respect to FIGS. 3-7.

Figure 3:
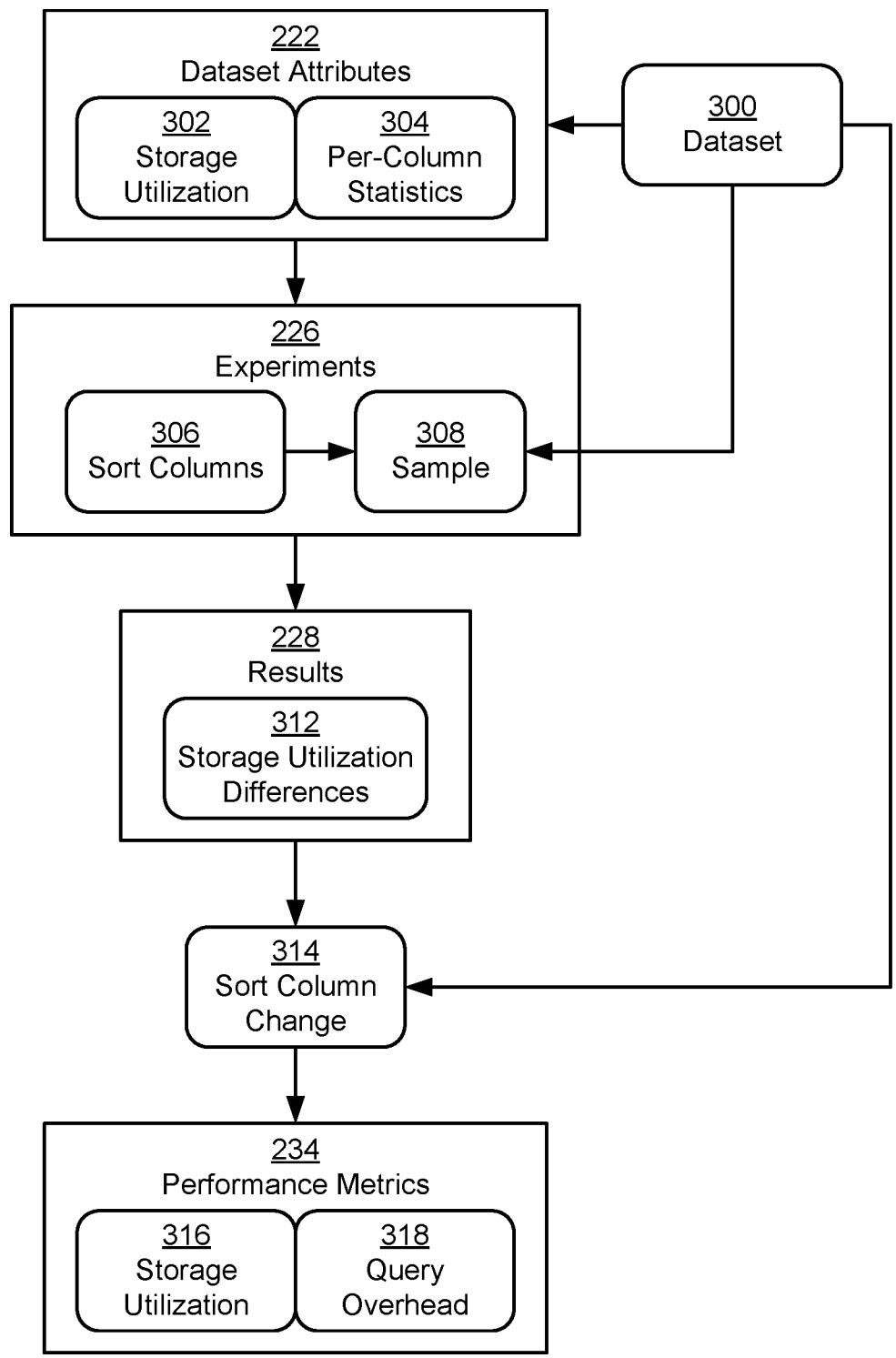
FIG. 3 illustrates an example optimization of a sort column to improve a storage utilization associated with a dataset, according to various embodiments.

FIG. 3 illustrates an example optimization of a sort column to improve a storage utilization 302 associated with a dataset 300, according to various embodiments. As shown in FIG. 3, dataset attributes 222 that are used to identify dataset 300 as a candidate for this type of sort column optimization include one or more measures of storage utilization 302 for dataset 300 and/or per-column statistics 304 for individual columns in dataset 300. For example, storage utilization 302 could include (but are not limited to) a total size of dataset 300, the proportion of total available storage in data store 202 occupied by dataset 300, and/or other metrics related to the amount of space consumed by dataset 300. Per-column statistics 304 could include (but are not limited to) the proportion of storage of dataset 300 occupied by each column in dataset 300, the amount of space occupied by each column in dataset 300, the average field size for one or more columns in dataset 300, measures of encoding or compression efficiency for individual columns in dataset 300, the number of unique values in a given column of dataset 300, and/or other metrics that are calculated for individual columns in dataset 300. Discovery module 206 could determine that dataset 300 is a candidate for this type of sort column optimization when one or more metrics related to storage utilization 302 exceed a threshold (e.g., if dataset 300 is determined to be "large" relative to other datasets), when one or more columns in dataset 300 occupy a significant proportion of storage in dataset 300, and/or when the column(s) include data that is not encoded or compressed well.

Next, evaluation module 208 executes experiments 226 that rewrite a sample 308 of dataset 300 to reflect one or more sort columns 306. For example, evaluation module 208 could obtain sample 308 as a subset of files and/or records in dataset 300. Evaluation module 208 could then identify one or more columns by which dataset 300 can be sorted as sort columns 306 and rewrite sample 308 to be sorted by each of sort columns 306.

Evaluation module 208 also generates results 228 of experiments 226 that include storage utilization differences 312 between rewritten versions of sample 308 and the original sample 308. For example, evaluation module 208 could calculate storage utilization differences 312 as the difference between the amount of space occupied by the original sample 308 and the amount of space occupied by rewritten versions of sample 308 that are sorted by different sort columns 306. Because sample 308 is significantly smaller than dataset 300, rewriting sample 308 and evaluating the size of the rewritten sample 308 is much faster than rewriting dataset 300 and evaluating the size of the rewritten dataset 300.

Evaluation module 208 also identifies a sort column change 314 to be applied to dataset 300 based on results 228. For example, evaluation module 208 could compare storage utilization differences 312 in results 328 to identify a sort column associated with the greatest reduction in storage utilization in sample 308. Evaluation module 208 could then indicate that sort column change 314 corresponds to sorting dataset 300 by the identified sort column.

Optimization engine 124 then applies sort column change 314 to the entire dataset 300. For example, optimization engine 124 could rewrite dataset 300 to be sorted by the column indicated in sort column change 314. In another example, optimization engine 124 could update a table property in metadata for dataset 300 to specify the sort column associated with sort column change 314, which causes writers to dataset 300 to sort records associated with dataset 300 by the specified column before writing the records to a table storing dataset 300.

Optimization engine 124 also monitors performance metrics 234 that include a storage utilization 316 and/or query overhead 318 of the newly sorted dataset 300. For example, optimization engine 124 could verify that storage utilization 316 of dataset 300 is reduced after sort column change 314 is applied. Optimization engine 124 could also, or instead, verify that query overhead 318 associated with downstream queries of dataset 300 is not negatively impacted by sort column change 314 beyond an acceptable threshold.

In some embodiments, the sort column optimization illustrated in FIG. 3 can be performed to identify multiple sort columns by which dataset 300 is sorted. For example, sort columns 306 could include a primary sort column by which dataset 300 is sorted, as well as a secondary sort column by which records with the same value in the primary sort column are further sorted. Experiments 226 could be used to test different combinations of primary and secondary sort columns on sample 308. Alternatively, one round of experiments 226 could be used to select a primary sort column for dataset 300. After the primary sort column is applied to dataset 300 and verified to improve storage utilization 316 without negatively impacting query overhead 318 beyond an acceptable threshold, another round of experiments 226 could be used to select a secondary sort column and apply the secondary sort column to dataset 300. Additional rounds of experiments may optionally be performed to test and/or select additional sort columns 306 for dataset 300, beyond the primary and secondary sort columns.

Figure 4:
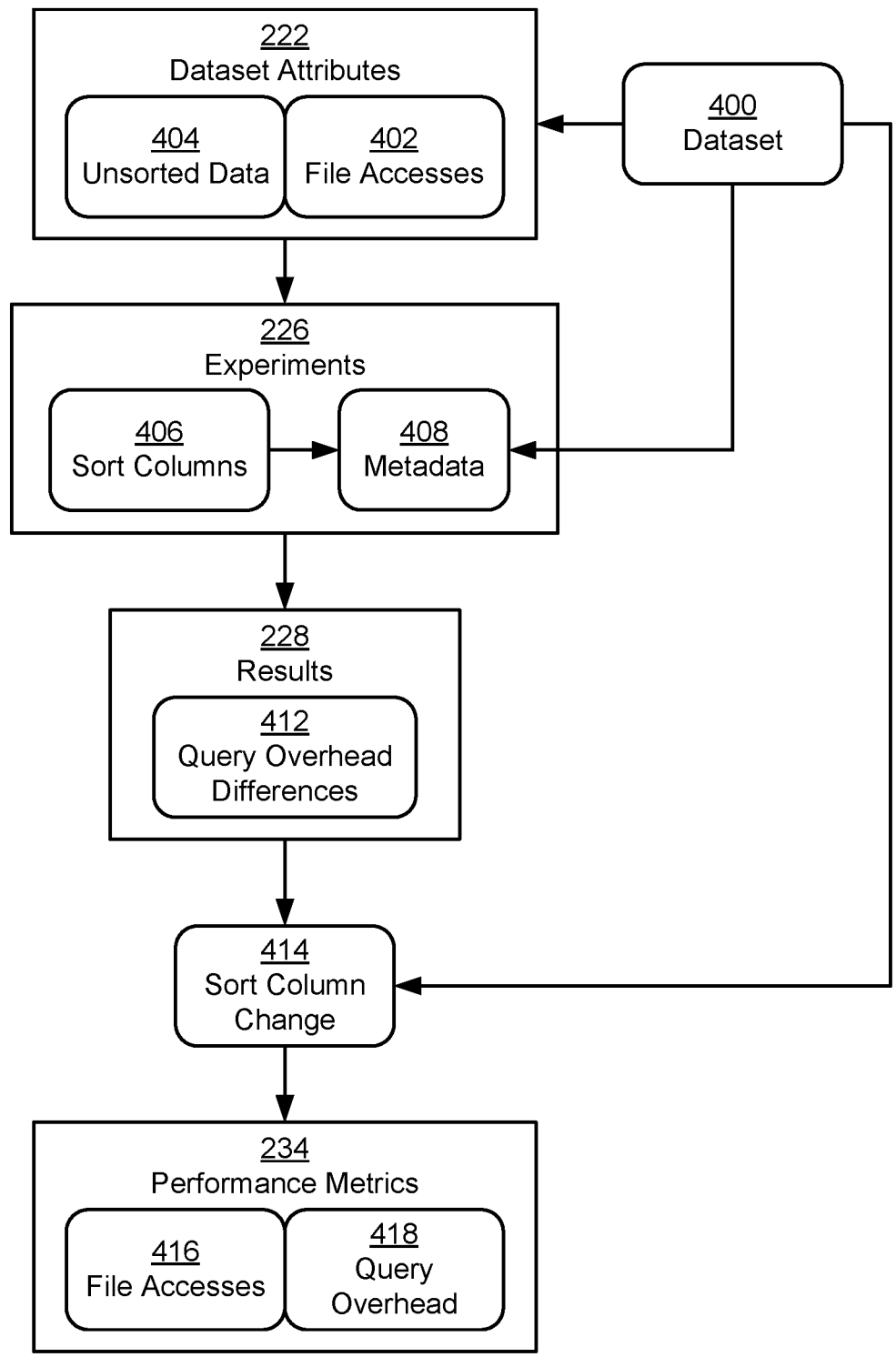
FIG. 4 illustrates an example optimization of a sort column to improve file accesses associated with querying of a dataset, according to various embodiments.

FIG. 4 illustrates an example optimization of a sort column to improve file accesses 402 associated with querying of a dataset 400, according to various embodiments. As shown in FIG. 4, dataset attributes 222 that are used to identify dataset 400 as a candidate for this type of sort column optimization include unsorted data 404 in dataset 400 and/or large numbers of file accesses 402 during queries of dataset 400. For example, discovery module 206 could identify dataset 400 as a candidate for sort column optimization to improve query overhead when dataset 400 lacks a sort column and/or the average number of files accessed during querying of dataset 400 exceeds a numeric, quantile, and/or another threshold.

Experiments 226 associated with this type of sort column optimization involve applying different sort columns 406 to metadata 408 for dataset 400. For example, evaluation module 208 could rewrite metadata 408 to simulate sorting of dataset 400 by various sort columns 406 and/or combinations of primary and secondary sort columns 406.

Results 228 of experiments 226 include query overhead differences 412 between the query overhead associated with evaluating a query on original metadata 408 for dataset 400 and the query overhead associated with evaluating the same query on each set of rewritten metadata 408 for dataset 400. Because metadata 408 is significantly smaller in size than dataset 400, rewriting metadata 408 and performing query evaluation on the rewritten metadata 408 is much faster than rewriting dataset 400 and performing query evaluation on the rewritten dataset 400.

Evaluation module 208 uses results 228 to identify a sort column change 414 to be applied to dataset 400. For example, sort column change 414 could be identified as one or more sort columns 406 (e.g., primary sort column, secondary sort column, additional sort columns after the primary and secondary sort columns, etc.) that produce the greatest reduction in query overhead in metadata 408, as determined by query overhead differences 412 in results 228.

Optimization engine 124 then applies sort column change 414 to the entire dataset 400. For example, optimization engine 124 could rewrite dataset 400 to be sorted by the column associated with sort column change 414. In another example, optimization engine 124 could update a table property in metadata for dataset 400 to specify the sort column associated with sort column change 414, which causes writers to dataset 400 to sort records associated with dataset 400 by the specified column before writing the records to a table storing dataset 400.

Optimization engine 124 also monitors performance metrics 234 that include file accesses 416 to the newly sorted dataset 400 and/or query overhead 418 associated with the newly sorted dataset 400. For example, optimization engine 124 could verify that the number of files accessed during queries of dataset 400 is reduced after sort column change 414 is applied. Optimization engine 124 could also, or instead, verify that query overhead 418 associated with downstream queries of dataset 400 is not negatively impacted by sort column change 414 beyond an acceptable threshold.

Figure 5:
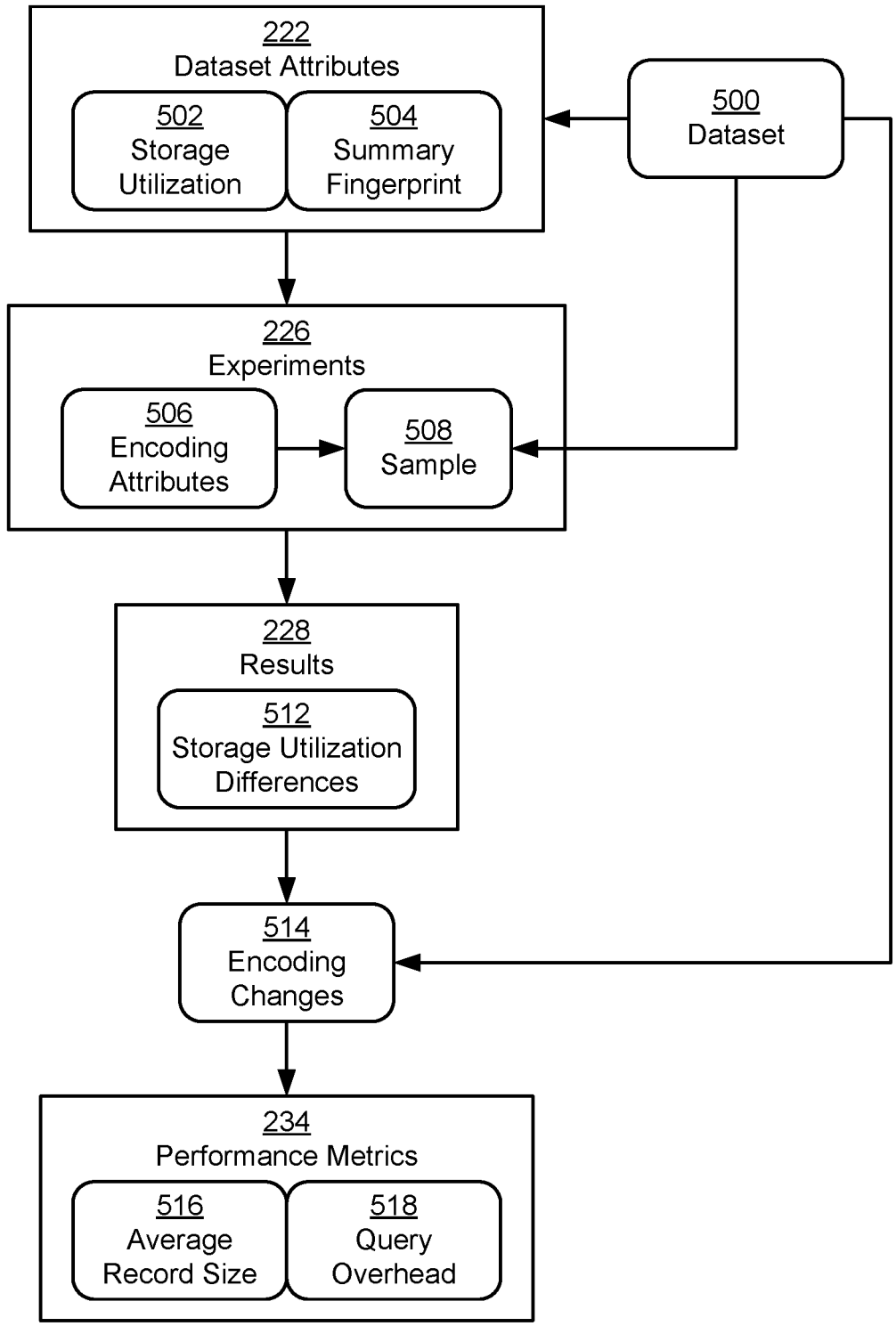
FIG. 5 illustrates an example optimization of a file encoding to improve a storage utilization associated with a dataset, according to various embodiments.

FIG. 5 illustrates an example optimization of a file encoding to improve a storage utilization 502 associated with a dataset 500, according to various embodiments. As shown in FIG. 5, dataset attributes 222 that are used to identify dataset 500 as a candidate for this type of file encoding optimization include a large storage utilization 502 (e.g., an amount of space occupied by dataset 500 that exceeds a threshold). If dataset 500 has previously been optimized with respect to file encoding, dataset attributes 222 can also include a summary fingerprint 504 for dataset 500. This summary fingerprint 504 can include (but is not limited to) the average record size associated with dataset 500, per-column statistics such as the proportion of storage of dataset 300 occupied by each column in dataset 300, and/or the savings in per-column storage associated with a previous round of encoding and/or compression optimization applied to dataset 500. If summary fingerprint 504 changes significantly over a period and/or since the file encoding of dataset 500 was last optimized, discovery module 206 could identify dataset 500 as a candidate for another round of file encoding optimization.

Experiments 226 associated with this type of file encoding optimization are used to identify encoding attributes 506 that result in the greatest improvement in storage utilization 502 of dataset 500. Results 228 of experiments 226 include storage utilization differences 512 that are used to select one or more encoding changes 514 to apply to dataset 500.

In one or more embodiments, multiple rounds of experiments 226 are used to evaluate the effects of various types of encoding attributes 506 on a sample 508 of files and/or records from dataset 500. Results 228 of each round of experiments 226 are used to select an encoding change corresponding to a particular type of encoding attribute to be applied to dataset 500, and subsequent rounds of experiments are used to test additional types of encoding attributes 506 and select encoding changes 514 corresponding to other types of encoding attributes 506.

For example, a first round of experiments 226 could involve rewriting sample 508 using different compression techniques and/or levels of compression. Results 228 of the first round of experiments 226 could include storage utilization differences 512 between the original sample 508 (which can be uncompressed or compressed using a certain compression technique or level) and additional compression techniques or levels applied to sample 508 in the first round of experiments 226. A compression technique and/or level that results in the greatest reduction in storage utilization 502 could be selected and added to encoding changes 514. Next, a second round of experiments 226 could involve rewriting sample 508 that has been compressed using the selected compression technique and/or level to have different dictionary sizes, while maintaining a constant ratio of dictionary size to row-group size. Results of the second round of experiments 226 could include storage utilization differences 512 among versions of sample 508 associated with different dictionary sizes. A dictionary size that produces the greatest reduction in storage utilization could be selected and added to encoding changes 514.

Continuing with the above example, after the compression technique and/or level and dictionary size have been selected based on the first two rounds of experiments 226, a third round of experiments could be performed to test different page-group and row-group size combinations on sample 508. The third round of experiments could apply discrete values of page-group and row-group sizes to sample 508, after sample 508 has been compressed using the selected compression technique and/or level and dictionary size. The page-group and row-group sizes that result in the greatest reduction in storage utilization could then be selected and added to encoding changes 514.

In some embodiments, evaluation module 208 performs experiments 226 multiple times to verify that encoding changes 514 selected from results 228 are stable. For example, evaluation module 208 could rerun experiments 226 on a daily and/or another periodic basis on a new sample 508 of files and/or records from dataset 500. After experiments 226 have been run a certain number of times, evaluation module 208 could compare multiple sets of encoding changes 514 produced by experiments 226. If these sets of encoding changes 514 are largely or completely consistent (e.g., if at least a majority of sets of encoding changes 514 are identical), evaluation module 208 could select the most consistent set of encoding changes 514 for subsequent use with dataset 500.

Evaluation module 208, optimization engine 124, and/or another component also, or instead, verify that encoding changes 514 do not result in a dataset configuration that adversely impacts storage, reading, writing, and/or querying of dataset 500. The dataset configuration could include (but is not limited to) a large number of records per row group and/or a significant increase in the time required to read or write a file (e.g., within or outside sample 508) that is written using encoding changes 514. If encoding changes 514 produce such a dataset configuration, the component may remove one or more values of encoding attributes 506 from encoding changes 514, change one or more values of encoding attributes 506 in encoding changes 514, rerun experiments 226 to select a different combination of encoding attributes 506 in encoding changes 514, skip file encoding optimization of dataset 500, and/or perform other actions to address potential issues associated with the dataset configuration.

After encoding changes 514 are determined to be consistent and not associated with issues with storage, reading, writing, and/or querying of dataset, optimization engine 124 applies encoding changes 514 to the entire dataset 500. For example, optimization engine 124 could rewrite dataset 500 to include encoding changes 514. In another example, optimization engine 124 could update one or more table properties in metadata for dataset 500 to specify encoding changes 514, which causes reads and writes of dataset 500 to be performed in accordance with encoding changes 514.

Optimization engine 124 also monitors performance metrics 234 that include an average record size 516 and/or query overhead 518 of the newly encoded dataset 500. For example, optimization engine 124 could verify that average record size 516 is reduced after encoding changes 514 are applied. Optimization engine 124 could also, or instead, verify that query overhead 518 associated with downstream queries of dataset 500 is not negatively impacted by encoding changes 514 beyond an acceptable threshold.

In some embodiments, optimization engine 124 applies encoding changes 514 sequentially and monitors performance metrics 234 over a period after each encoding change is applied before applying another encoding change. This limits the extent of changes to dataset 500 at a given time and can also be used to ensure that each encoding change individually improves average record size 516 without degrading query overhead 518.

Figure 6:
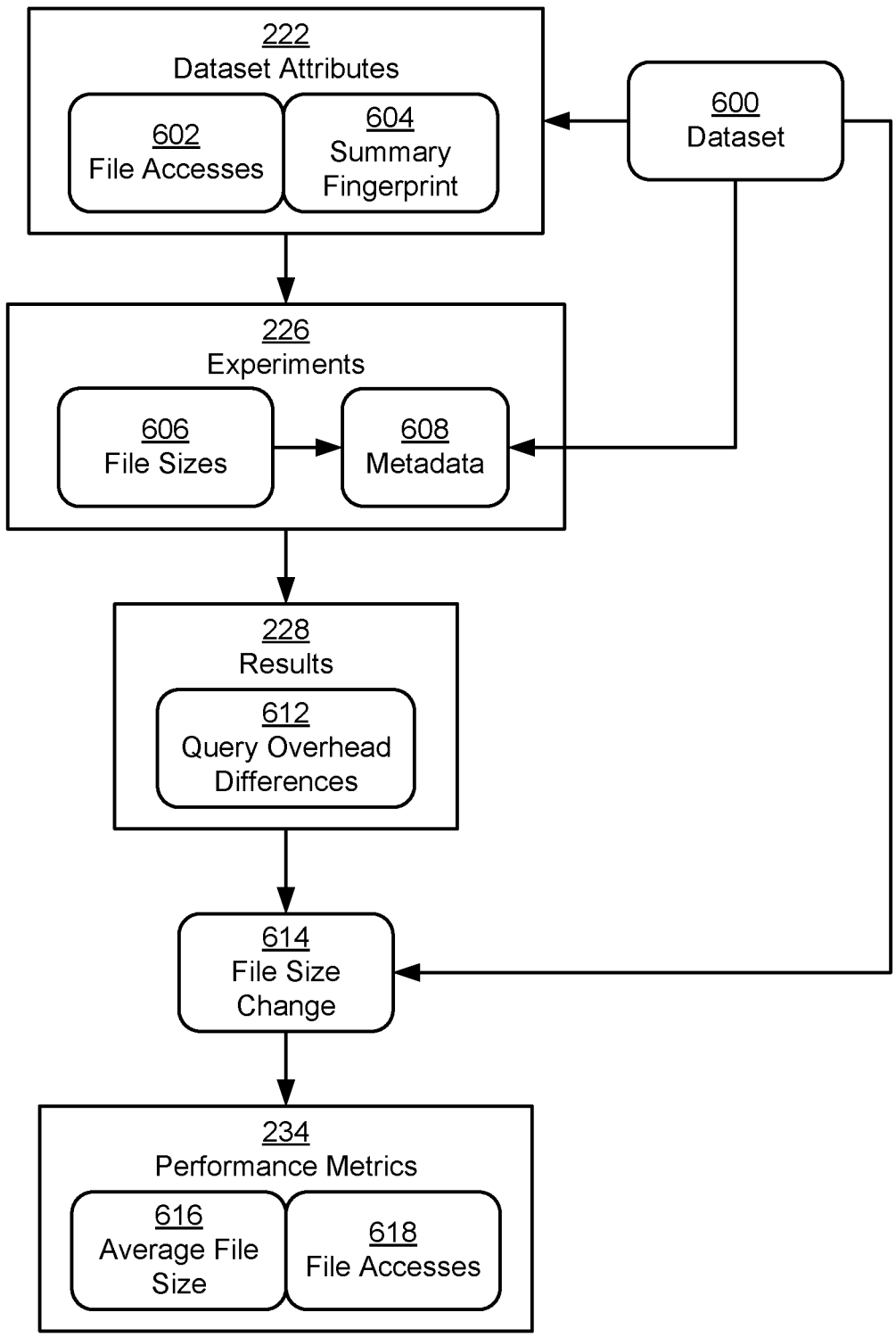
FIG. 6 illustrates an example optimization of a file size to improve file accesses associated with querying of a dataset, according to various embodiments.

FIG. 6 illustrates an example optimization of a file size to improve file accesses 602 associated with querying of a dataset 600, according to various embodiments. As shown in FIG. 6, dataset attributes 222 that are used to identify dataset 600 as a candidate for this type of file size optimization include large numbers of file accesses 602 during queries of dataset 600. For example, discovery module 206 could identify dataset 600 as a candidate for this type of file size optimization when the average number of files accessed during querying of dataset 600 exceeds a numeric, quantile, and/or another threshold. If dataset 600 has previously been optimized with respect to file size, dataset attributes 222 can also include a summary fingerprint 604 for dataset 600. This summary fingerprint 604 can include (but is not limited to) the number of files accessed during querying of dataset 600 over a period (e.g., a number of hours or days), the average number of files accessed by a query of dataset 600 over the same period or a different period, and/or the average file size of files in dataset 600. If summary fingerprint 604 changes significantly (e.g., over a certain interval of time or since dataset 600 was last optimized with respect to file size), discovery module 206 could indicate that dataset 600 is a candidate for this type of file size optimization.

Experiments 226 associated with this type of file size optimization involve estimating the effects of various file sizes 606 on dataset 600. For example, evaluation module 208 could rewrite metadata 608 for dataset 600 to simulate merging of smaller files in dataset 600 into larger file and/or rewriting of files in dataset 600 at different target file sizes 606.

Results 228 of experiments 226 include query overhead differences 612 between the query overhead associated with performing query evaluation on original metadata 608 for dataset 600 and the query overhead associated with performing query evaluation on each set of rewritten metadata 608 for dataset 600. For example, evaluation module 208 could generate results 228 by rerunning queries of dataset 600 on each set of rewritten metadata 608. Because metadata 608 is significantly smaller in size than dataset 600, rewriting metadata 608 and performing query evaluation on the rewritten metadata 608 is much faster than rewriting dataset 600 and performing query evaluation on the rewritten dataset 600.

Evaluation module 208 uses results 228 to identify one or more file size change 614 to be applied to dataset 600. For example, evaluation module 208 could determine file size change 614 as a target file size that produces the greatest reduction in query overhead in metadata 608, as determined by query overhead differences 612 in results 228.

Optimization engine 124 then applies file size change 614 to the entire dataset 600. For example, optimization engine 124 could rewrite dataset 400 to have the target file size associated with file size change 614. In another example, optimization engine 124 could update a table property in metadata for dataset 600 to target file size associated with file size change 614, which causes one or more components to rewrite dataset 600 across files that meet the target file size.

Optimization engine 124 also monitors performance metrics 234 that include an average file size 616 associated with dataset 600 and/or file accesses 618 to dataset 600. For example, optimization engine 124 could verify that the number of files accessed during queries of dataset 600 is reduced after file size change 614 is applied. Optimization engine 124 could also, or instead, verify that average file size 616 is within a certain threshold of the target file size associated with file size change 614.

Figure 7:
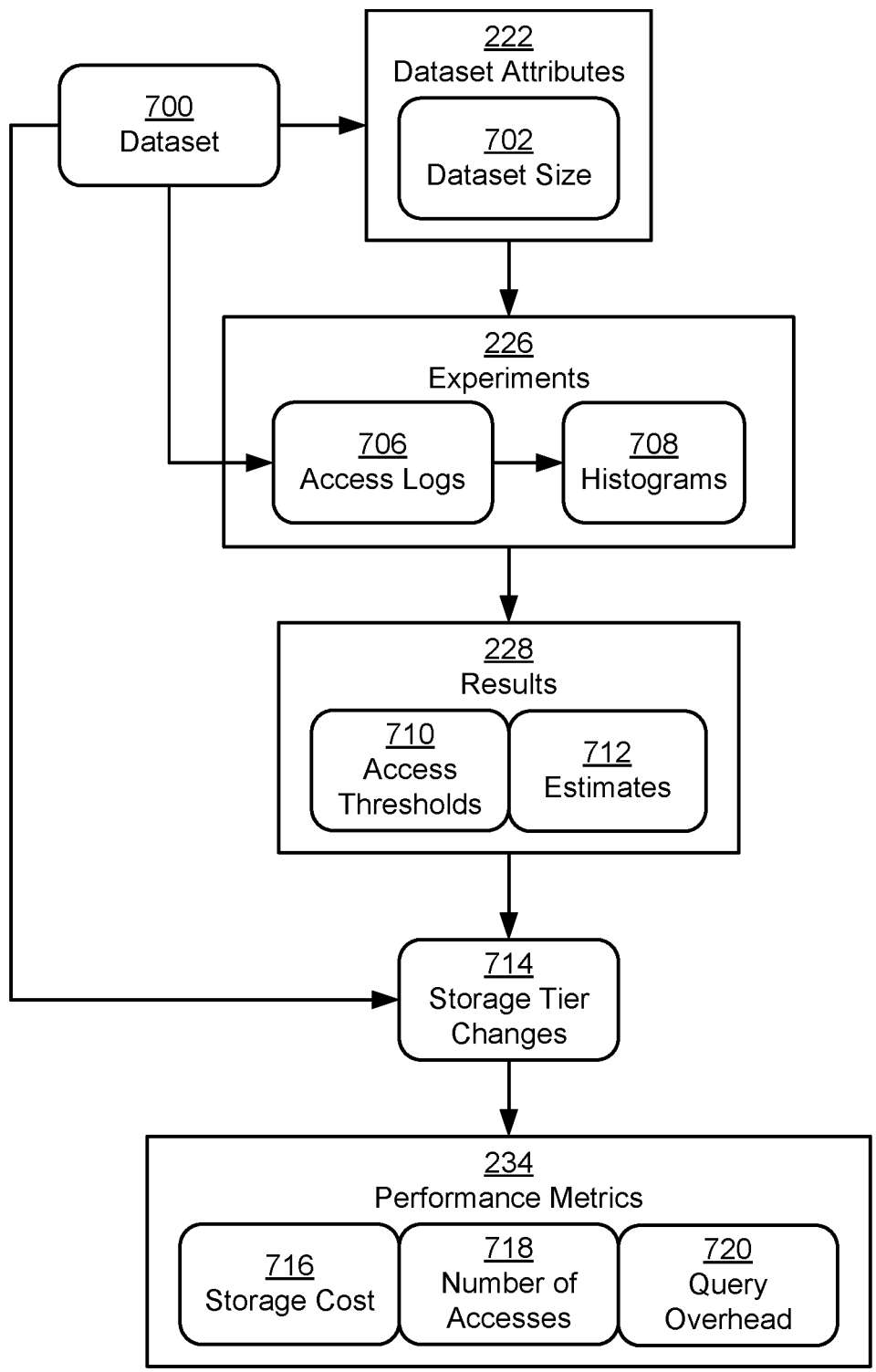
FIG. 7 illustrates an example optimization of a storage tier associated with a dataset to optimize one or more performance metrics associated with the dataset, according to various embodiments.

FIG. 7 illustrates an example optimization of a storage tier associated with a dataset 700 to optimize one or more performance metrics 234 associated with dataset 700, according to various embodiments. In some embodiments, the storage tier represents a collection of resources (e.g., processor, memory, network, etc.) used to store and/or query dataset 700. In addition, different storage tiers can be associated with different latencies, availabilities, costs, and/or other performance-related attributes. Thus, older data in dataset 700 can be moved from a first storage tier with lower latency higher availability, and/or higher cost to a second storage tier with higher latency, lower availability, and/or lower cost to reduce the storage utilization associated with the first storage tier and/or allow the first storage tier to accommodate new data. Similarly, data in dataset 700 can be dropped (i.e., deleted) from any storage tier to reduce storage utilization associated with dataset 700 and/or accommodate new data.

As shown in FIG. 7, dataset attributes 222 that are used to identify dataset 700 as a candidate for this type of sort column optimization include a dataset size 702 of dataset 700. For example, discovery module 206 could identify dataset 700 as a candidate for storage tier optimization when the amount of space occupied by dataset 700 exceeds a numeric, quantile, and/or another threshold. In another example, discovery module 206 could identify the largest N datasets as candidates for storage tier optimization.

Experiments 226 associated with this type of storage tier optimization involve generation of histograms 708 associated with access logs 706 for dataset 700. For example, evaluation module 208 could aggregate records of accesses to dataset 700 from access logs 706 into two histograms 708. The first histogram could include the number of accesses to data (e.g., records) in dataset 700 "binned" by the number of days (or another interval) since data in dataset 700 was first accessed. The second histogram could include the number of accesses to data in dataset 700 "binned" by the number of days (or another interval) since the previous access to the same data in dataset 700.

Results 228 of experiments 226 include access thresholds 710 associated with histograms 708. Access thresholds 710 include one or more time-based thresholds related to moving data in dataset 700 from a "higher" (e.g., lower latency, higher availability, higher cost, etc.) storage tier to a "lower" (e.g., higher latency, lower availability, lower cost, etc.) storage tier. Access thresholds 710 also, or instead, include one or more time-based thresholds related to dropping data from dataset 700. Continuing with the above example, the first histogram could be analyzed to identify a first number of days since data in dataset 700 was first accessed, after which the number of accesses to the same data falls below a numeric, quantile, and/or another threshold. This first number of days could represent a first access threshold for the number of days since data in dataset 700 was first accessed. Data that is older than this first access threshold could be dropped from dataset 700. The second histogram could also be analyzed to identify a second number of days since data in dataset 700 was previously accessed, after which the number of accesses to the same data falls below a numeric, quantile, and/or another threshold. This second number of days could represent a second access threshold for the number of days since data in dataset 700 was last accessed. Data that has not been accessed for longer than this second access threshold could be moved from the higher storage tier to the lower storage tier.

Results 228 of experiments 226 include estimates 712 of performance metrics 234 associated with different values of access thresholds 710. Continuing with the above example, estimates 712 could include storage cost 716, the number of accesses 718 to data in dataset 700 that has been moved to a lower storage tier and/or dropped (given a corresponding access threshold), and/or query overhead 720 associated with data that has been moved to the lower storage tier after different numbers of days since data in dataset 700 was first accessed or previously accessed.

Evaluation module 208 uses results 228 to select one or more access thresholds 710 for inclusion in storage tier changes 714 to be applied to dataset 700. Continuing with the above example, evaluation module 208 could compare different estimates 712 of storage cost 716, number of accesses 718, and/or query overhead 720 for different access thresholds 710 associated with dropping data in dataset 700. Evaluation module 208 could then select, as the first access threshold for dropping data in dataset 700, a number of days since the data was first accessed that indicates that data that is older than that has a very low likelihood of being queried. Evaluation module 208 could also compare different estimates 712 of storage cost 716, number of accesses 718, and/or query overhead 720 for different access thresholds 710 associated with moving data in dataset 700 to a lower storage tier. Evaluation module 208 could then select, as the second access threshold for moving data in dataset 700 to a lower storage tier, a number of days since the data was last accessed that balances the reduction in storage cost 716 associated with moving the data with the corresponding increase in query overhead 720 of the data.

Optimization engine 124 then applies storage tier changes 714 to dataset 700. Continuing with the above example, optimization engine 124 could create a "lifecycle policy," tag, and/or another type of configuration mechanism for dataset 700 that includes access thresholds 710. One or more components would automatically enforce access thresholds 710 by dropping data in dataset 700 with a time since first access that exceeds the first access threshold and/or by moving data in dataset 700 with a time since a previous access that exceeds the second access threshold to the lower storage tier.

Optimization engine 124 also monitors performance metrics 234 that include storage cost 716, number of accesses 718, and/or query overhead 720 associated with the moved or dropped data. For example, optimization engine 124 could verify that storage cost 716 associated with dataset 700 is reduced after storage tier changes 714 are applied. Optimization engine 124 could also, or instead, verify that number of accesses 718 to the moved or dropped data matches or falls below the corresponding estimates 712. Optimization engine 124 could also, or instead, verify that query overhead 720 associated with downstream queries of dataset 700 is not negatively impacted by storage tier changes 714 beyond an acceptable threshold.

Figure 8:
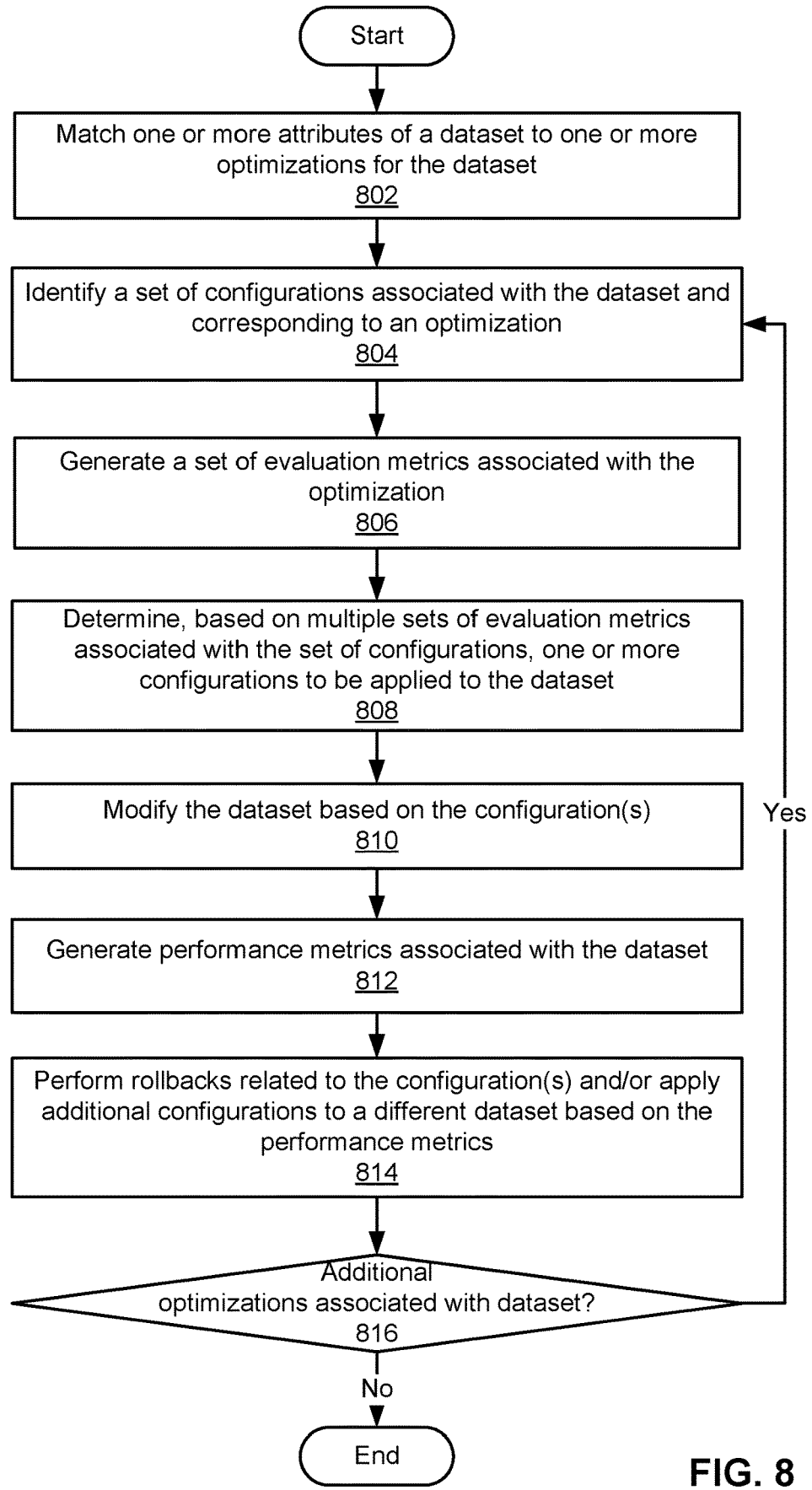
FIG. 8 is a flow diagram of method steps for optimizing a dataset, according to various embodiments.

FIG. 8 is a flow diagram of method steps for optimizing a dataset, according to various embodiments. Although the method steps are described in conjunction with the systems of FIGS. 1-2, persons skilled in the art will understand that any system configured to perform the method steps in any order falls within the scope of the present disclosure.

As shown, analysis engine 122 matches 802 one or more attributes of a dataset to one or more optimizations for the dataset. For example, analysis engine 122 could maintain mappings between dataset attributes and optimizations. Analysis engine 122 could also scan datasets in a data store for these dataset attributes. When a dataset includes one or more dataset attributes that match one or more values associated with a given optimization and/or fall within a range of values associated with the optimization, analysis engine 122 identifies the dataset as a candidate for the optimization.

Next, analysis engine 122 identifies 804 a set of configurations associated with the dataset and corresponding to an optimization. For example, analysis engine 122 could determine a finite set of configurations that are related to the optimization and can be applied to the dataset. These configurations could include pre-specified values that can be applied to multiple datasets (e.g., a list of discrete compression techniques, compression levels, dictionary sizes, page-group sizes, row-group sizes, etc.) and/or values that are customized to the dataset (e.g., target file sizes that are calculated based on the current average file size in the dataset, one or more sort columns in the dataset, etc.).

Analysis engine 122 generates 806 a set of evaluation metrics associated with the optimization. For example, analysis engine 122 could execute a number of experiments that estimate the effect of each configuration on a performance metric targeted by the optimization and/or one or more additional performance metrics associated with querying, storage, or use of the dataset. The estimated effect of a given configuration on the performance metric(s) includes one or more evaluation metrics, which are used to generate results of the corresponding experiment.

Analysis engine 122 then determines 808, based on multiple sets of evaluation metrics associated with the set of configurations, one or more configurations to be applied to the dataset. For example, analysis engine 122 could identify the configuration(s) associated with the best estimated improvement in the performance metric targeted by the optimization and that do not degrade the other performance metrics by more than a threshold.

Optimization engine 124 modifies 810 the dataset based on the configuration(s). For example, analysis engine 122 could apply the configuration(s) to the dataset by rewriting the dataset and/or metadata for the dataset to include the configuration(s).

Optimization engine 124 further generates 812 performance metrics associated with the dataset after the dataset is modified. For example, optimization engine 124 could monitor the storage utilization, query overhead, storage cost, file size, number of file accesses, and/or other performance metrics for a period after the dataset is modified. Optimization engine 124 could also compare these performance metrics to previous values of the performance metrics for the dataset, before the configuration(s) were applied to the dataset.

Finally, analysis engine 122 and/or optimization engine 124 perform 814 rollbacks related to the configuration(s) and/or apply additional configurations to a different dataset based on the performance metrics. For example, optimization engine 124 could undo the configuration(s) when the performance metric targeted by the optimization is not improved by the configuration(s) and/or when other performance metrics are adversely impacted by the configuration(s) beyond a threshold. In another example, optimization engine 124 could determine that the performance metric target by the optimization is improved after the configuration(s) are applied and apply the same configuration(s) or similar configuration(s) to another dataset that shares one or more attributes in common with the dataset.

Analysis engine 122 and/or optimization engine 124 could determine 816 whether additional optimizations are associated with the dataset. If additional optimizations have been identified for the dataset, analysis engine 122 and optimization engine 124 could repeat operations 804-814 for each of the optimizations to perform multiple types of optimizations on the dataset. For example, analysis engine 122 could determine that the largest dataset in the data store includes a first column that consumed a majority of the space occupied by the dataset. Analysis engine 122 could sort a sample of the dataset on the first column and determine that the sorting reduced the size of the sample by almost 50%. Analysis engine 122 could also sort the sample on one or more other columns and identify a second column that reduces the size of the sample by a comparable amount when the sample is sorted by the second column. Analysis engine 122 could further determine that sorting the sample by the second column incurs less computational overhead than sorting the sample by the first column. Optimization engine 124 could then cause the entire dataset to be sorted by the second column and verify a decrease in size of the dataset decreased after the sorting is complete. Analysis engine 122 could subsequently determine that a compression technique applied to a sample of the sorted dataset led to a further reduction in storage space. Optimization engine 124 could then cause the entire dataset to be compressed using the compression technique and verify that the compression technique resulted in an additional reduction in storage utilization of the entire dataset. Consequently, in this example, analysis engine 122 and optimization engine 124 perform two separate optimizations that, in combination, reduce storage utilization of the dataset by a greater amount than either optimization alone.

In sum, the disclosed techniques provide a data optimization framework that executes a multi-step process to apply various types of optimizations to datasets in a data store. These optimizations include (but are not limited to) changes to file encodings, file sizes, sort columns, and/or storage tiers associated with the dataset. These changes can be made to improve the storage utilization, query overhead, and/or another performance metric of interest associated with the dataset.

First, the dataset optimization framework discovers datasets that are likely to benefit the most from each type of optimization. In particular, the dataset optimization framework scans datasets in the data store for attributes that indicate a potential compatibility with a certain type of optimization. Datasets that include these attributes are then flagged as candidates for that type of optimization.

Next, the dataset optimization framework runs experiments to determine the most optimal configuration of a dataset that is identified as a candidate for a particular type of optimization. The experiments test or simulate various configurations of the dataset that are related to the optimization and estimate the impact of each configuration on storage utilization, query overhead, and/or other performance metrics. The experiments are additionally designed or selected to minimize the impact on the data store.

The dataset optimization framework also applies one or more configurations that improve the desired performance metrics to the dataset and monitors the performance of the dataset to verify that the configuration(s) have the expected effect. For example, the dataset optimization framework could rewrite the dataset and/or metadata related to the dataset to apply the configuration(s) to the dataset. The dataset optimization framework could then monitor performance metrics for the dataset to verify that the improvements identified in experiments related to the configuration(s) are observed in the actual dataset.

Finally, the dataset optimization framework uses the monitored performance metrics to further optimize the dataset and/or other datasets. For example, the dataset optimization framework could roll back a change to the configuration of the dataset if the performance metrics indicate that the configuration does not improve or negatively impacts the storage utilization, query overhead, and/or another type of performance metric associated with the dataset. In another example, the dataset optimization framework could determine that the configuration successfully improves one or more performance metrics of interest. The dataset optimization framework could then apply the same configuration to a different dataset that shares one or more attributes with the dataset.

One technical advantage of the disclosed techniques relative to the prior art is that, with the disclosed techniques, datasets in a data store can be automatically and efficiently identified as candidates for multiple types of optimization, evaluated with respect to various configurations related to each type of optimization, and modified to incorporate one or more configurations that improve different types of performance. Accordingly, the disclosed techniques generate greater improvements in storage utilization, query overhead, and/or other performance metrics related to the datasets than conventional techniques that can only evaluate the impact of a limited set of configuration changes on the performance metric(s). Further, because datasets are scanned, evaluated, and optimized in an efficient manner, the disclosed techniques are faster, more scalable, and incur less resource overhead than conventional techniques that involve teams of users interacting with tools or applications to manually identify datasets that are performing suboptimally, apply configuration changes to individual datasets, and analyze the impact of the configuration changes on the performance of each dataset. These technical advantages provide one or more technological advancements over prior art approaches.

1. In some embodiments, a computer-implemented method comprises determining, based on one or more attributes of a first dataset, a first optimization for the first dataset, wherein the first optimization is associated with at least one of a file encoding, a file size, and a sort column, identifying a first plurality of candidate configurations associated with the first dataset and corresponding to the first optimization, for each candidate configuration in the first plurality of candidate configurations, generating a corresponding set of evaluation metrics associated with the first optimization, determining, based on the sets of evaluation metrics corresponding to the first plurality of candidate configurations, a first set of configurations in the first plurality of candidate configurations to be applied to the first dataset, and modifying the first dataset based on the first set of configurations.

2. The computer-implemented method of clause 1, further comprising determining a second optimization for the first dataset, wherein the second optimization is different from the first optimization, identifying a second plurality of candidate configurations associated with the first dataset and corresponding to the second optimization, for each candidate configuration in the second plurality of candidate configurations, generating a corresponding set of evaluation metrics associated with the second optimization, determining, based on the sets of evaluation metrics corresponding to the second plurality of candidate configurations, a second set of configurations in the second plurality of candidate configurations to be applied to the first dataset, and modifying the first dataset based on the second set of configurations.

3. The computer-implemented method of clauses 1 or 2, further comprising generating a set of performance metrics associated with the first dataset after the first dataset is modified, and selecting a second set of configurations included in the first plurality of candidate configurations to be applied to a second dataset based on the set of performance metrics.

4. The computer-implemented method of any of clauses 1-3, further comprising performing a rollback that removes the first set of configurations from the first dataset upon determining that a performance metric in the set of performance metrics is lower than a threshold.

5. The computer-implemented method of any of clauses 1-4, wherein determining the first optimization for the first dataset comprises matching one or more attributes of the first dataset to the first optimization.

6. The computer-implemented method of any of clauses 1-5, wherein determining the first optimization for the first dataset further comprises scanning a plurality of datasets for the one or more attributes.

7. The computer-implemented method of any of clauses 1-6, wherein determining the first set of configurations to be applied to the first dataset comprises applying a first plurality of encoding attributes to a portion of the first dataset, generating a first subset of the sets of evaluation metrics corresponding to the first plurality of candidate configurations, wherein the first subset of the sets of evaluation metrics measures effects of the first plurality of encoding attributes on the portion of the first dataset, and selecting, from the first plurality of encoding attributes, a first encoding attribute to apply to the first dataset based on the first subset of the sets of evaluation metrics.

8. The computer-implemented method of any of clauses 1-7, wherein determining the first set of configurations to be applied to the first dataset further comprises applying a second plurality of encoding attributes to the portion of the first dataset after the first encoding attribute is applied to the portion, generating a second subset of the sets of evaluation metrics corresponding to the first plurality of candidate configurations, wherein the second subset of the sets of evaluation metrics measures effects of the second plurality of encoding attributes on the portion of the first dataset, and selecting, from the second plurality of encoding attributes, a second encoding attribute to apply to the first dataset based on the second subset of the sets of evaluation metrics.

9. The computer-implemented method of any of clauses 1-8, wherein the first plurality of encoding attributes and the second plurality of encoding attributes comprise at least one of a compression type, a dictionary size, a page group size, and a row group size.

10. The computer-implemented method of any of clauses 1-9, wherein the corresponding set of evaluation metrics comprises at least one of a storage utilization of the first dataset or a query overhead of the first dataset.

11. In some embodiments, one or more non-transitory computer readable media stores instructions that, when executed by one or more processors, cause the one or more processors to perform the steps of determining a first optimization and a second optimization for a first dataset based on one or more attributes of the first dataset, wherein the one or more attributes comprise at least one of a storage utilization of the first dataset, a number of files accessed during querying of the first dataset, a compression efficiency associated with the first dataset, and a size of the first dataset, identifying a first plurality of candidate configurations associated with the first dataset and corresponding to the first optimization and a second plurality of candidate configurations associated with the first dataset and corresponding to the second optimization, for each candidate configuration in the first plurality of candidate configurations, generating a corresponding first set of evaluation metrics associated with the first optimization, for each candidate configuration in the second plurality of candidate configurations, generating a corresponding second set of evaluation metrics associated with the second optimization, determining, based on the sets of evaluation metrics corresponding to the first plurality of candidate configurations, a first set of configurations in the first plurality of candidate configurations to be applied to the first dataset, determining, based on the sets of evaluation metrics corresponding to the second plurality of candidate configurations, a second set of configurations in the second plurality of candidate configurations to be applied to the first dataset, and modifying the first dataset based on the first set of configurations and the second set of configurations.

12. The one or more non-transitory computer readable media of clause 11, wherein the instructions further cause the one or more processors to perform the steps of evaluating a storage utilization and a query overhead associated with the first dataset after the first dataset is modified, and applying a third set of configurations to the first dataset based on the storage utilization and the query overhead.

13. The one or more non-transitory computer readable media of clauses 11 or 12, wherein applying the third set of configurations to the first dataset comprises at least one of rolling back the first set of configurations or the second set of configurations when the storage utilization or the query overhead exceed a threshold, or applying the third set of configurations to the first dataset based on a third set of evaluation metrics associated with the first set of configurations or the second set of configurations.

14. The one or more non-transitory computer readable media of any of clauses 11-13, wherein determining the first set of configurations to be applied to the first dataset comprises generating the sets of evaluation metrics corresponding to the first plurality of candidate configurations to measure a first plurality of effects of a plurality of sort columns on the first dataset, and selecting, from the plurality of sort columns, one or more sort columns to apply to the first dataset based on the sets of evaluation metrics corresponding to the first plurality of candidate configurations.

15. The one or more non-transitory computer readable media of any of clauses 11-14, wherein generating the sets of evaluation metrics corresponding to the first plurality of candidate configurations comprises applying the plurality of sort columns to a portion of the first dataset, and for each sort column in the plurality of sort columns, determining a storage utilization associated with the portion of the first dataset.

16. The one or more non-transitory computer readable media of any of clauses 11-15, wherein generating the sets of evaluation metrics corresponding to the first plurality of candidate configurations comprises rewriting metadata for the first dataset based on the plurality of sort columns, and for each sort column in the plurality of sort columns, determining a query overhead associated with the metadata.

17. The one or more non-transitory computer readable media of any of clauses 11-16, wherein determining the first set of configurations to be applied to the first dataset comprises generating the sets of evaluation metrics corresponding to the first plurality of candidate configurations to measure effects of a plurality of file sizes on the first dataset, and selecting, from the plurality of file sizes, a target file size to apply to the first dataset based on the sets of evaluation metrics corresponding to the first plurality of candidate configurations.

18. The one or more non-transitory computer readable media of any of clauses 11-17, wherein generating the sets of evaluation metrics corresponding to the first plurality of candidate configurations comprises rewriting metadata for the first dataset based on the plurality of file sizes, and for each file size in the plurality of file sizes, determining a query overhead associated with the metadata.

19. The one or more non-transitory computer readable media of any of clauses 11-18, wherein the first optimization and the second optimization comprise at least one of a file encoding, a file size, and a threshold associated with moving the first dataset to a different storage tier.

20. In some embodiments, a system comprises a memory that stores instructions, and a processor that is coupled to the memory and, when executing the instructions, is configured to determine a first optimization and a second optimization for a first dataset based on one or more attributes of the first dataset, wherein the first optimization and the second optimization comprise at least one of a file encoding, a file size, a sort column, and a threshold associated with moving the first dataset to a different storage tier, identify a first plurality of candidate configurations associated with the first dataset and corresponding to the first optimization and a second plurality of candidate configurations associated with the first dataset and corresponding to the second optimization, for each candidate configuration in the first plurality of candidate configurations, generate a first set of evaluation metrics associated with the first optimization, for each candidate configuration in the second plurality of candidate configurations, generate a second set of evaluation metrics associated with the second optimization, determine, based on the sets of evaluation metrics corresponding to the first plurality of candidate configurations, a first set of configurations in the first plurality of candidate configurations to be applied to the first dataset, determine, based on the sets of evaluation metrics corresponding to the second plurality of candidate configurations, a second set of configurations in the second plurality of candidate configurations to be applied to the first dataset, and modify the first dataset based on the first set of configurations and the second set of configurations.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    determining, based on one or more attributes of a first dataset, a first optimization for the first dataset, wherein the first optimization is associated with at least one of a file encoding, a file size, or a sort column;
    identifying a first plurality of candidate configurations associated with the first dataset and corresponding to the first optimization;
    for each candidate configuration in the first plurality of candidate configurations, generating a corresponding set of evaluation metrics associated with the first optimization;
    determining, based on the sets of evaluation metrics corresponding to the first plurality of candidate configurations, a first set of configurations in the first plurality of candidate configurations to be applied to the first dataset; and
    modifying the first dataset based on the first set of configurations.

2. The computer-implemented method of claim 1, further comprising:
    determining a second optimization for the first dataset, wherein the second optimization is different from the first optimization;
    identifying a second plurality of candidate configurations associated with the first dataset and corresponding to the second optimization;
    for each candidate configuration in the second plurality of candidate configurations, generating a corresponding set of evaluation metrics associated with the second optimization;
    determining, based on the sets of evaluation metrics corresponding to the second plurality of candidate configurations, a second set of configurations in the second plurality of candidate configurations to be applied to the first dataset; and
    modifying the first dataset based on the second set of configurations.

3. The computer-implemented method of claim 1, further comprising:
    generating a set of performance metrics associated with the first dataset after the first dataset is modified; and
    selecting a second set of configurations included in the first plurality of candidate configurations to be applied to a second dataset based on the set of performance metrics.

4. The computer-implemented method of claim 3, further comprising performing a rollback that removes the first set of configurations from the first dataset upon determining that a performance metric in the set of performance metrics is lower than a threshold.

5. The computer-implemented method of claim 1, wherein determining the first optimization for the first dataset comprises matching one or more attributes of the first dataset to the first optimization.

6. The computer-implemented method of claim 5, wherein determining the first optimization for the first dataset further comprises scanning a plurality of datasets for the one or more attributes.

7. The computer-implemented method of claim 1, wherein determining the first set of configurations to be applied to the first dataset comprises:
    applying a first plurality of encoding attributes to a portion of the first dataset;
    generating a first subset of the sets of evaluation metrics corresponding to the first plurality of candidate configurations, wherein the first subset of the sets of evaluation metrics measures effects of the first plurality of encoding attributes on the portion of the first dataset; and
    selecting, from the first plurality of encoding attributes, a first encoding attribute to apply to the first dataset based on the first subset of the sets of evaluation metrics.

8. The computer-implemented method of claim 7, wherein determining the first set of configurations to be applied to the first dataset further comprises:
    applying a second plurality of encoding attributes to the portion of the first dataset after the first encoding attribute is applied to the portion;
    generating a second subset of the sets of evaluation metrics corresponding to the first plurality of candidate configurations, wherein the second subset of the sets of evaluation metrics measures effects of the second plurality of encoding attributes on the portion of the first dataset; and
    selecting, from the second plurality of encoding attributes, a second encoding attribute to apply to the first dataset based on the second subset of the sets of evaluation metrics.

9. The computer-implemented method of claim 8, wherein the first plurality of encoding attributes and the second plurality of encoding attributes comprise at least one of a compression type, a dictionary size, a page group size, or a row group size.

10. The computer-implemented method of claim 1, wherein the corresponding set of evaluation metrics comprises at least one of a storage utilization of the first dataset or a query overhead of the first dataset.

11. One or more non-transitory computer readable media storing instructions that, when executed by one or more processors, cause the one or more processors to perform the steps of:
    determining a first optimization and a second optimization for a first dataset based on one or more attributes of the first dataset, wherein the one or more attributes comprise at least one of a storage utilization of the first dataset, a number of files accessed during querying of the first dataset, a compression efficiency associated with the first dataset, or a size of the first dataset;

identifying a first plurality of candidate configurations associated with the first dataset and corresponding to the first optimization and a second plurality of candidate configurations associated with the first dataset and corresponding to the second optimization;

for each candidate configuration in the first plurality of candidate configurations, generating a corresponding first set of evaluation metrics associated with the first optimization;

for each candidate configuration in the second plurality of candidate configurations, generating a corresponding second set of evaluation metrics associated with the second optimization;

determining, based on the sets of evaluation metrics corresponding to the first plurality of candidate configurations, a first set of configurations in the first plurality of candidate configurations to be applied to the first dataset;

determining, based on the sets of evaluation metrics corresponding to the second plurality of candidate configurations, a second set of configurations in the second plurality of candidate configurations to be applied to the first dataset; and modifying the first dataset based on the first set of configurations and the second set of configurations.

12. The one or more non-transitory computer readable media of claim 11, wherein the instructions further cause the one or more processors to perform the steps of:

evaluating a storage utilization and a query overhead associated with the first dataset after the first dataset is modified; and applying a third set of configurations to the first dataset based on the storage utilization and the query overhead.

13. The one or more non-transitory computer readable media of claim 12, wherein applying the third set of configurations to the first dataset comprises at least one of:

rolling back the first set of configurations or the second set of configurations when the storage utilization or the query overhead exceed a threshold; or applying the third set of configurations to the first dataset based on a third set of evaluation metrics associated with the first set of configurations or the second set of configurations.

14. The one or more non-transitory computer readable media of claim 11, wherein determining the first set of configurations to be applied to the first dataset comprises:

generating the sets of evaluation metrics corresponding to the first plurality of candidate configurations to measure a first plurality of effects of a plurality of sort columns on the first dataset; and selecting, from the plurality of sort columns, one or more sort columns to apply to the first dataset based on the sets of evaluation metrics corresponding to the first plurality of candidate configurations.

15. The one or more non-transitory computer readable media of claim 14, wherein generating the sets of evaluation metrics corresponding to the first plurality of candidate configurations comprises:

applying the plurality of sort columns to a portion of the first dataset; and for each sort column in the plurality of sort columns, determining a storage utilization associated with the portion of the first dataset.

16. The one or more non-transitory computer readable media of claim 14, wherein generating the sets of evaluation metrics corresponding to the first plurality of candidate configurations comprises:

rewriting metadata for the first dataset based on the plurality of sort columns; and for each sort column in the plurality of sort columns, determining a query overhead associated with the metadata.

17. The one or more non-transitory computer readable media of claim 11, wherein determining the first set of configurations to be applied to the first dataset comprises:

generating the sets of evaluation metrics corresponding to the first plurality of candidate configurations to measure effects of a plurality of file sizes on the first dataset; and selecting, from the plurality of file sizes, a target file size to apply to the first dataset based on the sets of evaluation metrics corresponding to the first plurality of candidate configurations.

18. The one or more non-transitory computer readable media of claim 17, wherein generating the sets of evaluation metrics corresponding to the first plurality of candidate configurations comprises:

rewriting metadata for the first dataset based on the plurality of file sizes; and for each file size in the plurality of file sizes, determining a query overhead associated with the metadata.

19. The one or more non-transitory computer readable media of claim 11, wherein the first optimization and the second optimization comprise at least one of a file encoding, a file size, or a threshold associated with moving the first dataset to a different storage tier.

20. A system, comprising:

a memory that stores instructions, and a processor that is coupled to the memory and, when executing the instructions, is configured to:

determine a first optimization and a second optimization for a first dataset based on one or more attributes of the first dataset, wherein the first optimization and the second optimization comprise at least one of a file encoding, a file size, a sort column, or a threshold associated with moving the first dataset to a different storage tier;

identify a first plurality of candidate configurations associated with the first dataset and corresponding to the first optimization and a second plurality of candidate configurations associated with the first dataset and corresponding to the second optimization;

for each candidate configuration in the first plurality of candidate configurations, generate a first set of evaluation metrics associated with the first optimization;

for each candidate configuration in the second plurality of candidate configurations, generate a second set of evaluation metrics associated with the second optimization;

determine, based on the sets of evaluation metrics corresponding to the first plurality of candidate configurations, a first set of configurations in the first plurality of candidate configurations to be applied to the first dataset;

determine, based on the sets of evaluation metrics corresponding to the second plurality of candidate configurations, a second set of configurations in the second plurality of candidate configurations to be applied to the first dataset; and modify the first dataset based on the first set of configurations and the second set of configurations.

\* \* \* \* \*